Figure 1:
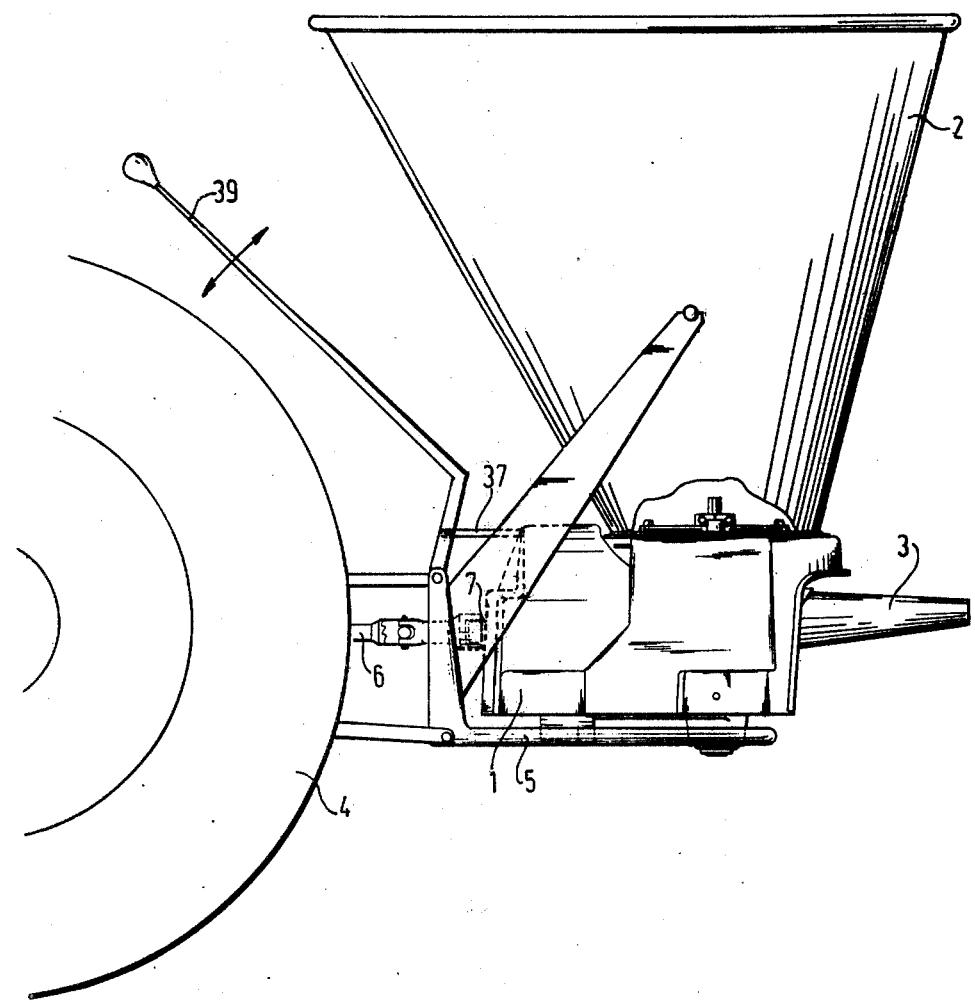

United States Patent [19]
Oosterling et al.

[11] 4,179,073
[45] Dec. 18, 1979

[54] DRIVING UNIT FOR AN OSCILLATING SPREADING PIPE OF A DEVICE FOR DISTRIBUTING MATERIAL

[75] Inventors: Pieter A. Oosterling; Hermanus H. Vissers, both of Nieuw-Vennep, Netherlands

[73] Assignee: Multinorm, B.V., Nieuw-Vennep, Netherlands

[21] Appl. No.: 881,062

[22] Filed: Feb. 24, 1978

[30] Foreign Application Priority Data

May 5, 1977 [NL] Netherlands .......................... 7704974

[51] Int. Cl.² .............................................. A01C 3/06
[52] U.S. Cl. .................................... 239/659; 239/661; 239/689
[58] Field of Search ................... 239/288, 288.3, 288.5, 239/659, 670, 689

[56] References Cited

U.S. PATENT DOCUMENTS

| | | | |
|---|---|---|---|
| 3,322,429 | 5/1967 | Cervelli | 239/670 |
| 3,777,992 | 12/1973 | de Koning | 239/689 |
| 3,837,407 | 9/1974 | de Koning et al. | 239/659 X |
| 3,993,225 | 11/1976 | Manni | 239/689 X |

FOREIGN PATENT DOCUMENTS 826593  1/1960  United Kingdom ...................... 239/659

*Primary Examiner*—John J. Love
*Attorney, Agent, or Firm*—John P. Snyder

[57] ABSTRACT

A driving unit supported by a frame for an oscillating spreading pipe of a device for distributing material, for example, fertilizer, said unit mainly comprising a drivable fly-wheel, a holder for the spreading pipe to be oscillated by the fly-wheel through a coupling element eccentrically journalled in said fly-wheel and a dosing mechanism arranged above said holder, wherein a part of the frame thereof extends in dish-shaped fashion on either side of the driving unit, said dish-shaped frame portion not only serves as a protective member during transport, but also operates as a stiffening part.

11 Claims, 4 Drawing Figures

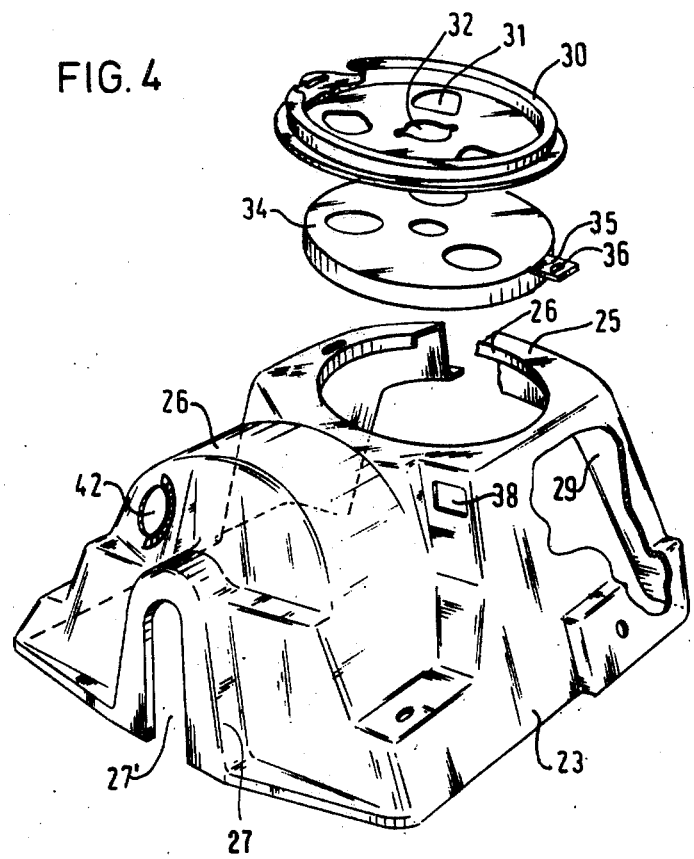

DRIVING UNIT FOR AN OSCILLATING SPREADING PIPE OF A DEVICE FOR DISTRIBUTING MATERIAL

The invention relates to a driving unit supported by a frame for an oscillating spreading pipe of a device for distributing material, for example, fertilizer, said unit mainly comprising a drivable fly-wheel, a holder for the spreading pipe to be oscillated by the fly-wheel through a coupling element eccentrically journalled in said fly-wheel and a dosing mechanism arranged above said holder.

The invention has for its object to improve the frame of the driving unit so that optimum reliability and safety in operation are ensured.

The driving unit of the kind set forth is characterized in accordance with the invention in that part of the frame thereof extends in dish-shaped fashion on either side of the driving unit.

The dish-shaped frame portion provides a protection for the driving unit, which is particularly important for modern mounting methods. The driving unit serves for assembling devices of different capacities and the like, which devices are assembled in the closest possible proximity of the potential user, the driving unit being delivered as a prefabricated part to the area of assembling. The dish-shaped frame portion not only serves as a protective member during transport, but also operates as a stiffening part. Moreover, the protective and stiffening functions of the frame portion are useful during operation, since the user is protected against the rapidly reciprocating parts of the driving unit, whilst despite the oscillatory movements the rigidity of the frame contributes to a quiet run of the device.

By utilizing the stiffening function of the dish-shaped parts the invention proposes, in addition, to center the dosing mechanism with respect to the holder by means of the dish-shaped part. Thus post-adjustment of the various parts with respect to one another at the area of assembling is avoided.

The dish-shaped frame portion is, in addition, particularly suitable to form reference surfaces for the various control-members. Reference is made in this respect to the control-member for the dosing mechanism and the tool for setting the eccentricity of the bearing of the coupling element in the fly-wheel.

In a preferred embodiment the frame portion is formed by a single casting, for example, of synthetic material.

The invention will be described more fully with reference to an embodiment. In the drawing FIG. 1 is a side elevation of a driving unit comprising a frame in accordance with the invention employed in a spreading device carried by a vehicle, FIG. 2 is a longitudinal sectional view of the device of FIG. 1, FIG. 3 is a sectional view of the device of FIG. 1, FIG. 4 is a perspective view of the dish-shaped frame portion.

The spreading device shown in FIG. 1 mainly comprises a driving unit 1, a hopper 2 arranged thereon and a distributing pipe 3 fastened to the driving unit. The spreading device is arranged on a frame 5 attached to the three-point hitch of an agricultural tractor 4. The power take-off shaft of the agricultural tractor 4 drives through an appropriate coupling the fly-wheel shaft 7 of the driving unit 1.

Figure 2:
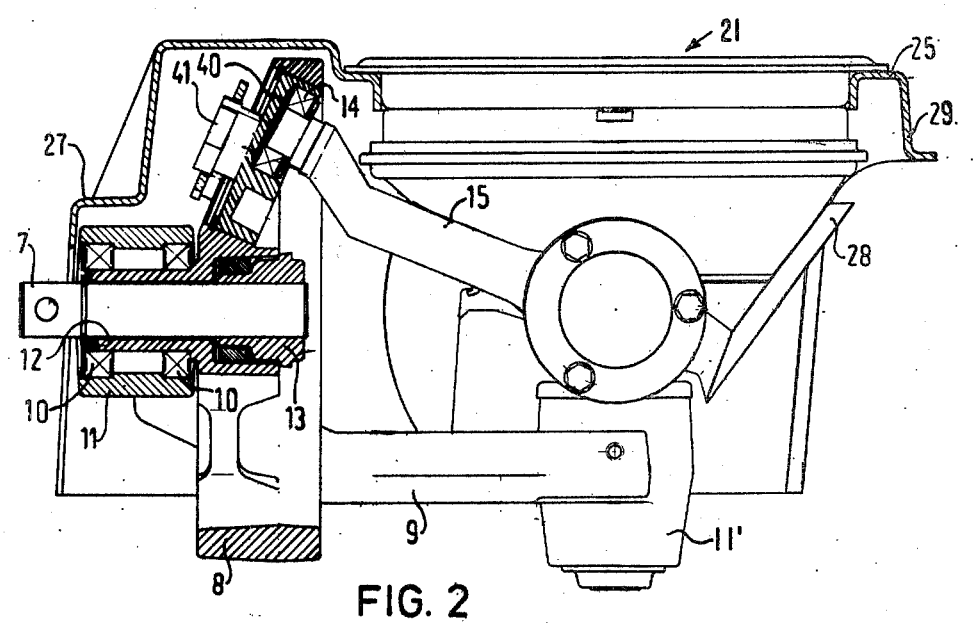
Figure 3:
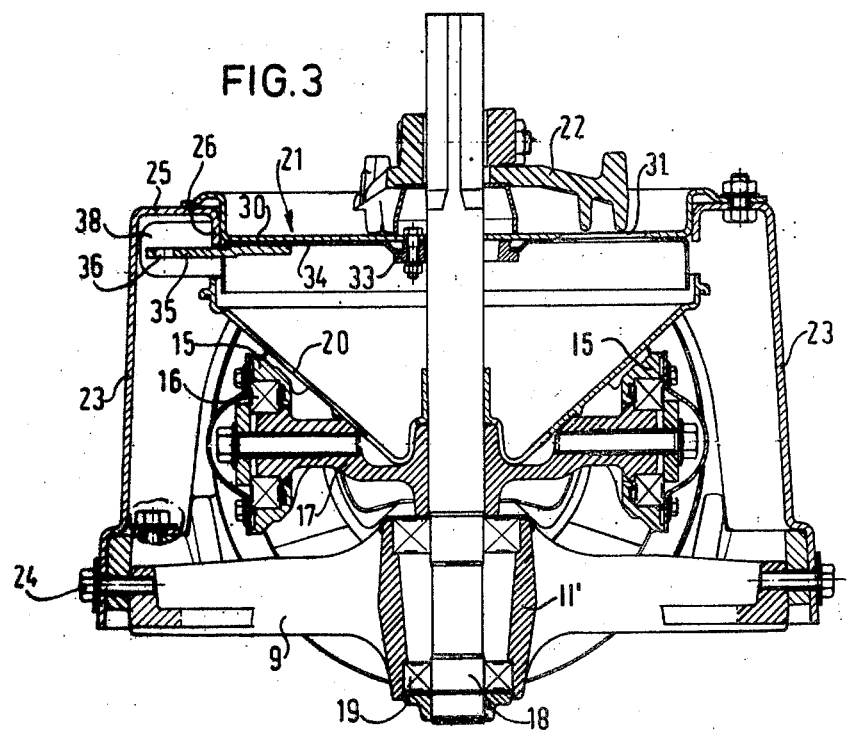

The driving unit is shown in detail in FIGS. 2 and 3. The fly-wheel shaft 7 driven by the power take-off shaft 6 holds a fly-wheel 8 journalled in a frame 9 of the driving unit by means of a bearing 10. For this purpose the frame 9 is provided with a bearing bushing or boss 11, whilst a hub 12 of the fly-wheel 8 is slipped onto the shaft 7. The coupling between the shaft 7 and the fly-wheel 8 is established by an elastic claw coupling 13. The bearing 14 of a coupling element 15 is eccentrically arranged in the fly-wheel 8. The coupling element is constructed in the form of a fork, the stem of which is surrounded by the bearing 14, whereas the fork eyelets are held by means of bearings 16 on a holder 17 (see FIG. 3).

The holder 17 is provided with a spindle 18 rotatably journalled at the lower end by means of a bearing 19 held in the boss 11' frame 9.

In the embodiment shown the holder 17 is provided on the top side with a conical guide element 20, above which is arranged a dosing mechanism 21. Above the dosing member 21 an agitator 22 is rigidly secured to the top end of the spindle 18.

According to the main feature of the invention the frame 9 is enlarged so that dish-shaped frame portions 23 are located on either side of the driving unit 1 (see FIGS. 3 and 4). By the lower rim the dish-shaped frame portion 23 is secured by means of bolts 24 to the frame portion 9 and extends upwardly by a bent-over, horizontal, annular part and by an inwardly bent-over, second annular part 25 and 26 respectively. The two annular parts serve as a supporting rim and a centering rim for the dosing mechanism 21.

The dish-shaped frame portion 23 extends around the fly wheel 8 by a hood-shaped part 27 interconnecting the two side parts 23. The hood-shaped part 27 has, at the front, a slot-like recess 27', through which the fly-wheel shaft 7 is passed to the outside. The holder 17 is provided on the side remote from the fly-wheel 8 with a connecting flange 28, to which the distributing pipe 3 has to be fastened. Apart from an arcuate strip portion 29 suspending from the annular rim 25 the rear side of the dish-shaped frame portion, as seen in FIG. 4, is open.

The dosing mechanism 21 comprises a disc 30 bearing on the rim 25 and having passages 31. (see FIG. 4). Through a central opening 32 of the disc 30 is passed the spindle 18, whilst a ring 33 is secured to the disc 30 around the opening 32. The ring 33 holds a disc 34 corresponding with the disc 30 and also having passages so that by turning the disc 34 with respect to the disc 30 the passages of the two discs can register to a greater or lesser extent. The turn of the disc 34 can be produced by means of a tag 35 fastened to the periphery of the disc 34 and having an eyelet 36. With this connecting eyelet is coupled the control-rod 37 of the dosing mechanism (see FIG. 1), said control-rod 37 being passed through an opening 38 in the dish-shaped frame portion.

The dish-shaped frame portion 23 is formed around this opening 38 so that a vertical stop surface is obtained, which may serve as a reference surface, for example, the closed position of the dosing mechanism 21, that is to say, the position in which the discs 30 and 34 have turned so that their passages are not located in overlying positions. The stop surface around the opening 38 may co-operate with a stop (not shown) on the control-rod 37. The rod 37 may be reciprocated by any actuating mechanism, as in the embodiment shown, by a manually operated lever 39.

FIG. 2 illustrates the displaceability of the eccentricity of the coupling element 15 in the fly-wheel 8. The bearing 14 is held eccentrically in a rotatable, cylindrical element 40, which is rotatable by means of a stub 41 projecting out of the fly-wheel 8. The stub is suitably shaped to permit of being turned by an appropriate tool. The tool can be passed through an opening 42 in the hood-shaped part 26 of the dish-shaped frame portion. In a preferred embodiment the edge of the opening 42 is provided with indices to permit assessment of the eccentricity from the outside.

From the Figures it will be apparent that the dish-shaped frame portion 23, 26 provides satisfactory protection for the driving unit described above. The front, upper and side faces shown in FIG. 4 extend completely around the driving unit, whereas the rear side is left open only for passing the oscillating distributing pipe. Moreover, the bottom side is completely open to freely conduct away any dirt which might nevertheless penetrate.

What is claimed is:

1. A driving unit supported by a frame for the oscillating distributing pipe of a device for spreading material, for example, fertilizer, said unit mainly comprising a drivable fly-wheel, a distirbuting-pipe holder to be oscillated by the fly-wheel through a coupling element eccentrically journalled in said fly-wheel and a dosing mechanism arranged above said holder, characterized in that a portion of the frame extends in a dish-shaped fashion on either side of the driving unit, said dish-shaped portion having an opening receiving and locating said dosing mechanism.

2. A device as claimed in claim 1 characterized in that the dish-shaped frame portion has at least one recess, the circumferential rim of which serves as a datum surface.

3. A device as claimed in claim 2 characterized in that the datum surface serves as a stop face for a member displacing the dosing mechanism.

4. A device as claimed in claim 1 characterized in that the dish-shaped frame portion is enlarged around the fly wheel in the shape of a hood.

5. A device as claimed in claim 4 comprising a setting mechanism in the fly-wheel for changing the eccentricity of the coupling element therein characterized in that the hood-shaped part has a recess for giving access to a setting tool for the setting mechanism.

6. A device as claimed in claim 2 characterized in that the datum surface around said recess is provided with indices for the eccentricity of the coupling element.

7. A device as claimed in claim 1 characterized in that the dish-shaped frame portion is manufactured as a single casting.

8. A device as claimed in claim 1 characterized in that the dish-shaped frame portion is made from synthetic material.

9. A material spreading unit comprising a frame adapted to be driven by a power take-off shaft of a powered vehicle, said frame having a substantially horizontal first boss at its forward end and an upright second boss at its rearward end, a shaft journalled in said first boss and having at its forward end means adapted for driving connection with a power take-off shaft of a vehicle, a flywheel connected to said shaft rearwardly of said first boss, a spindle rotatably received in said second boss and projecting upwardly therefrom, a holder connected to said spindle above said second boss, drive means coupling said holder to said flywheel for oscillating said holder and spindle as the flywheel rotates, distributing means connected to said holder for broadcasting material such as fertilizer, said distributor means comprising a material-receiving member surrounding said spindle and having an upwardly facing inlet, and a distributor pipe communicating with said material-receiving member and projecting substantially horizontally and rearwardly therefrom whereby to whip back and forth as the holder oscillates and fling the material from the rearward end of the distributor pipe, a rigidifying frame in the form of an inverted, dish-shaped housing attached at its lower, open side to said frame and extending in covering relation to said first and second bosses as well as the flywheel, the drive means, the holder, the drive means and said material-receiving member, and a dosing assembly carried by said housing in vertical registry with said inlet of the material-receiving member.

10. A material spreading unit as defined in claim 9 wherein said dosing assembly defines a recess for receiving and locating the discharge end of a hopper.

11. A material spreading unit as defined in claim 10 in combination with a carrier frame adapted to be attached to a powered vehicle, the frame first mentioned being removably supported on said carrier frame and said carrier frame having support arm means thereon for supporting a hopper above said unit, and a hopper engaged with said support arm means and having its lower, discharge end received in said recess of the dosing assembly.

* * * * *